April 24, 1962  F. DILTS  3,030,911
VEHICLE TIRE LOW PRESSURE WARNING DEVICE
Filed Jan. 5, 1961
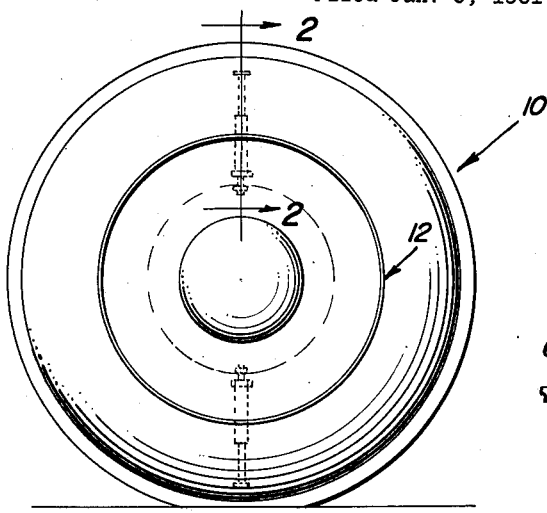
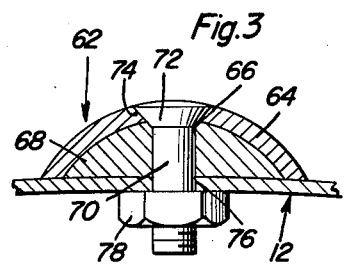
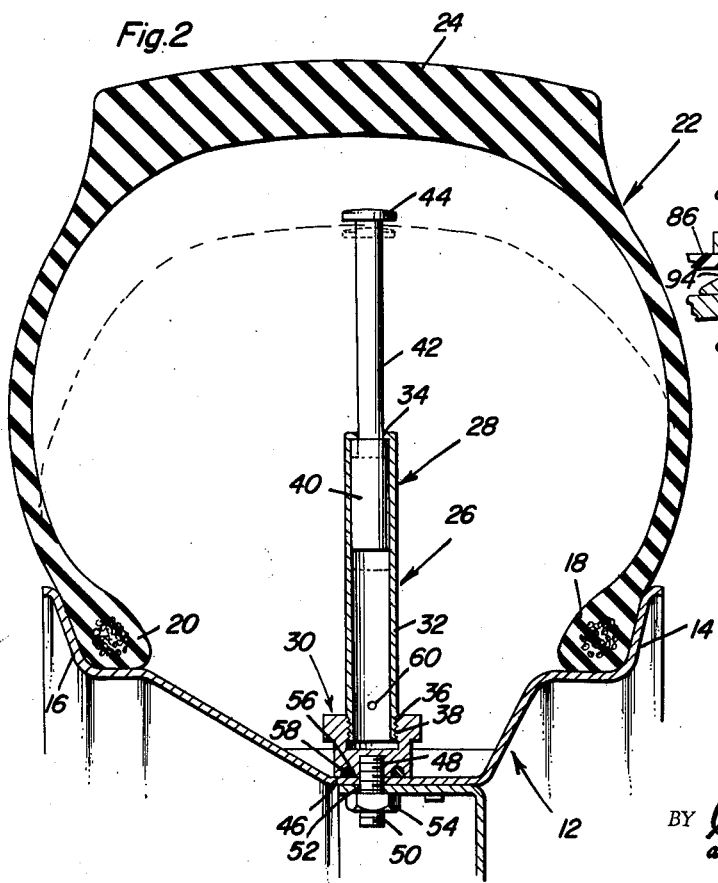
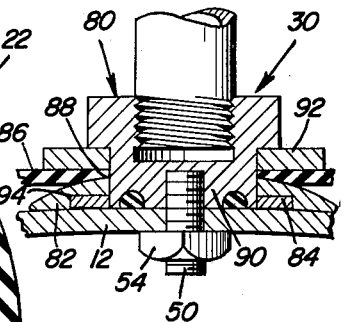
Fred Dilts
INVENTOR.

United States Patent Office 3,030,911
Patented Apr. 24, 1962

3,030,911
VEHICLE TIRE LOW PRESSURE
WARNING DEVICE
Fred Dilts, 2929 Cascade, Pueblo, Colo.
Filed Jan. 5, 1961, Ser. No. 80,802
8 Claims. (Cl. 116—34)

This invention relates to a vehicle tire low pressure warning device and more particularly to a warning device which may be rigidly attached to the wheel on which a vehicle tire is mounted and utilized to effect an audible signal upon the reduction of air pressure within the vehicle tire.

The vehicle tire low pressure warning device includes the provision of an elongated carrier member adapted to be secured to the wheel of a vehicle extending radially and outwardly therefrom between the tire flanges of the wheel. An elongated impact member is slidably mounted on the carrier member for sliding longitudinal reciprocating movement relative thereto and longitudinally thereof. Abutment means is carried by the impact member and is engageable with a portion of the carrier member for emitting an audible signal upon sharp outward movement of the impact member relative to the carrier member such as would occur if low air pressure within a vehicle tire caused the tire to deflect an amount sufficient to slide the impact member inwardly relative to the carrier member as that portion of the vehicle tire corresponding to the portion of the rim or wheel on which the warning device is mounted contacts the ground. The movement of that portion of the vehicle tire from engagement with the ground then enabling the impact member to again slide outwardly relative to the carrier member by centrifugal force whereupon the abutment carried by the impact member will sharply engage the portion of the carrier member holding the impact member captive and emit an audible signal to warn the driver of the vehicle that one of its tires does not have the proper air pressure.

The main object of this invention is to provide a vehicle tire low pressure warning device which will be capable of emitting an audible signal to warn the driver of a vehicle when one of its tires is low.

A further object of this invention, in accordance with the immediately preceding object, is to provide a warning device which will emit louder signals in response to continued loss of air pressure within a vehicle tire.

A still further object of this invention is to provide a weight attachment substantially the same in weight as the warning device so that the weight attachment may be secured to a vehicle wheel diametrically opposite from the warning device whereby the balance of the wheel may be maintained.

Another object of this invention is to provide a means for mounting a warning device within the confines of a vehicle tire mounted on the wheel and in a manner whereby the mounting of the warning device on the wheel will not cause air to leak from within the tire mounted on that wheel.

A final object to be specifically enumerated herein is to provide a vehicle tire low pressure warning device which will conform to conventional forms of manufacture, be of simple construction and easy to operate so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a vehicle wheel having a tire mounted thereon, the vehicle tire low pressure warning device of the instant invention being shown in phantom lines;

FIGURE 2 is an enlarged transverse vertical sectional view taken substantially upon the plane indicated by section line 2—2 of FIGURE 1 and showing an alternate position of the vehicle tire and the warning device in phantom lines;

FIGURE 3 is a fragmentary enlarged sectional view taken substantially through the center of the weight attachment comprising a part of the present invention; and FIGURE 4 is a fragmentary vertical sectional view similar to that of FIGURE 2 but on a larger scale showing the manner in which the warning device may be used in conjunction with vehicle tires having inner tubes disposed therein.

Referring now more specifically to the drawings, the numeral 10 generally designates a vehicle tire which is mounted on a rim generally designated by the reference numeral 12. The vehicle rim 12 includes annular outer tire flanges 14 and 16 between which the beads 18 and 20 of a tire generally designated by the reference numeral 22 are disposed when the tire 22 is mounted on the rim 12. The tire 22 includes a crown portion 24 which is normally disposed a given distance outwardly of the rim 12 when inflated to a proper pressure.

The vehicle tire low pressure warning device of the instant invention is generally designated by the reference numeral 26 and includes an elongated carrier member generally referred to by reference numeral 28 which is secured to the rim 12 by means of a fitting generally referred to by the reference numeral 30. The carrier member 28 comprises an elongated cylindrical sleeve member 32 having an apertured outer end wall 34. The end of the sleeve 32 remote from the end wall 34 is externally threaded as at 36 and is threadedly engaged in a threaded blind bore 38 formed in the fitting 30. A piston 40 is snugly and slidably received within the sleeve 32 and is provided with an elongated shank portion 42 which is received through the apertured end wall 34 and provided with a diametrically enlarged outer end head portion 44.

The fitting 30 includes a mounting face 46 remote from the side of the fixture through which the blind bore 38 opens and the face 46 is adapted to be secured in surface-to-surface contacting relation with the rim 12 as can be seen in FIGURE 2 of the drawings. A threaded blind bore 48 opens outwardly through the face 46 and one end of a stud 50 is threadedly engaged therein. The outer end of the stud 50 projecting from the face 46 of the fitting 30 is disposed through a bore 52 formed in the rim 12 and secured thereto by means of a threaded fastener 54.

The face 46 of the fitting 30 has an annular groove 56 formed therein which is concentric with the bore 48. A sealing member 58 formed of any suitable resilient material such as rubber is disposed within the groove 56 and forms an air tight seal about the stud 50 between the fitting 30 and the rim 12.

The end portion of the sleeve 32 remote from the apertured end wall 34 is provided with a plurality of apertures 60 for venting the interior of the sleeve 32 with the ambient atmosphere comprising the captive air within in the tire 22.

With attention now directed more particularly to FIGURE 3 of the drawings it will be seen that the weight attachment generally referred to by the reference numeral 62 which includes a rigid semi-spherical member 64 apertured as at 66. A resilient sealing material 68 is disposed within a member 64 and about the shank 70 of the headed fastener 72 which extends through the opening 74 formed in the member 64. The fastener 72 may be secured through the opening 76 formed in the rim 12 at a position diametrically opposite the warning device 26 by means of the threaded fastener 78 in order that the rim 12 may maintain its balance. It is of course to be understood that the weight attachment 62 is of substantially the same weight as the warning device 26.

With attention now directed to FIGURE 4 of the drawings there will be seen a modified form of warning device which is generally designated by the reference numeral 80 and is substantially identical to the warning device 26 with the exception of being provided with an additional sealing washer 82 and a shim 84 each being of a calculated thickness in order not to damage the tube 86 by applying too much clamping action about the opening 88. The warning device 80 is to be used in connection with rims 12 having the inner tube 86 disposed therein. When the device 80 is used, an opening 88 is formed in the inner tube and the diametrically reduced portion 90 of the fixture 30 is passed therethrough. After a backing washer 92 has been disposed on the diametrically reduced portion 90. The washer 82 is then disposed on the diametrically reduced portion 90 and a shim of calculated thickness is seated within the recess 94 formed in the washer 82 in order that the inner tube 86 will be compressed a predetermined amount upon the tightening of the fastener 54 on the shank 50 to secure the fitting 30 to the rim 12.

In operation, either of the warning devices 26 and 80 may be mounted on the rim 12 in a manner which is believed to be obvious. An identical warning device may be then mounted diametrically opposite the first device as illustrated in FIGURE 1 or the weight attachment 62 may be mounted on the rim 12 in place of the additional warning device.

When the tire 22 is inflated properly as illustrated in solid lines in FIGURE 2 of the drawings, the crown 24 of the tire when engaging the ground will not be deflected an excessive amount and will not contact the diametrically enlarged head portion 44 of the impact member of which it is a part. However, should the air pressure within the tire 22 become excessively low, the crown 24 will be deflected a considerable amount upon contact with the ground and the impact member will be urged inwardly of the carrier member 28 whereupon further rotation of the tire 22 the portion of the crown 24 in direct alignment with the warning device 26 will again deflect to its normal position and allow the impact member to slide sharply outwardly relative to the carrier member 28 whereupon the piston 40 will sharply engage the apertured end wall 34 to emit an audible signal thus warning the driver that the tire 22 does not have sufficient air pressure therein.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use with a vehicle rim having a pair of laterally spaced tire flanges, a vehicle tire low pressure warning device comprising of a pair of members, a first of said members comprising an elongated carrier sleeve member having opposite ends, means carried by one end of said carrier member adapted to secure said carrier member to said vehicle rim between the confronting tire flanges thereof with said carrier member extending radially and outwardly of said rim, the second of said members comprising an elongated impact member slidably reciprocal in said sleeve member, and abutment means carried by one of said members and engageable with a portion of the other of said member for limiting outward movement of said impact member and for emitting an audible signal upon successive inward movement of said impact member and subsequent outward movement thereof, the outer end of said sleeve member being open, the outer end of said impact member snugly and slidably received in the outer end of said sleeve, the inner end of said impact member defining a piston snugly received within said sleeve, and vent means formed in the inner end of said sleeve member for venting the interior thereof with the ambient atmosphere comprising the captive air with a tire mounted on said wheel between said tire flanges.

2. The combination of claim 1 wherein said securing means comprises a fixture having a threaded stud projecting outwardly from one face thereof adapted to be secured through a bore formed in a vehicle wheel.

3. The combination of claim 2 including seal means carried by said one face for forming an air tight seal about said stud between said fixture and the vehicle wheel to which it is secured.

4. The combination of claim 3 including a blind threaded bore formed in said fixture through one face, said stud threadingly engaged in said bore.

5. The combination of claim 1 including an apertured end wall carried by the outer end of said carrier sleeve, said portion of said impact member comprising a piston comprising said abutment means disposed in said sleeve including a diametrically reduced shank portion slidably received through said end wall.

6. The combination of claim 5 including a diametrically enlarged outer end portion on said impact member adapted for engagement with the inner surfaces of the crown of a vehicle tire on said wheel.

7. The combination of claim 1 wherein said securing means comprises a fitting having a threaded stud projecting outwardly from one face thereof adapted to be secured through a bore formed in a vehicle wheel, said fitting including a blind bore formed in the side thereof remote from said stud, said sleeve being circular in cross-section and externally threaded on one end and threadedly engaged in said blind bore.

8. The combination of claim 1 including a weight attachment of substantially the same weight as said warning device and adapted to be secured to a vehicle wheel diametrically opposite said warning device.

References Cited in the file of this patent

UNITED STATES PATENTS 1,475,023   Moore _____ Nov. 20, 1923